US008228833B2

(12) United States Patent
Lee et al.

(10) Patent No.: US 8,228,833 B2
(45) Date of Patent: Jul. 24, 2012

(54) METHOD AND APPARATUS FOR PROVIDING ADDITIONAL INFORMATION ON DIGITAL BROADCASTING PROGRAM TO IPTV IN HOME NETWORK

(75) Inventors: Kwang-chul Lee, Suwon-si (KR); Ki-seok Chang, Suwon-si (KR); Akhil Chapalamadugu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1050 days.

(21) Appl. No.: 11/518,236

(22) Filed: Sep. 11, 2006

(65) Prior Publication Data

US 2007/0064637 A1   Mar. 22, 2007

(30) Foreign Application Priority Data

Sep. 16, 2005   (KR) .................. 10-2005-0086995

(51) Int. Cl.
*H04H 20/71* (2008.01)
(52) U.S. Cl. ....................................... 370/312
(58) Field of Classification Search ............. 370/312, 370/310
See application file for complete search history.

(56) References Cited

U.S. PATENT DOCUMENTS

| 6,005,603 | A  | * | 12/1999 | Flavin ................. 725/32 |
| 6,801,544 | B1 | * | 10/2004 | Rijckaert et al. ........... 370/473 |
| 7,522,904 | B1 | * | 4/2009  | Zhu ................. 455/403 |
| 7,636,932 | B2 | * | 12/2009 | Sakai ................. 725/82 |
| 2003/0063615 | A1 |   | 4/2003 | Luoma et al. |
| 2003/0229900 | A1 | * | 12/2003 | Reisman .................. 725/87 |
| 2004/0123097 | A1 |   | 6/2004 | Ranjan |
| 2004/0131014 | A1 | * | 7/2004 | Thompson et al. ........... 370/230 |
| 2005/0034166 | A1 | * | 2/2005 | Kim et al. ................. 725/119 |
| 2005/0076373 | A1 | * | 4/2005 | Jung ................. 725/80 |
| 2006/0008088 | A1 | * | 1/2006 | Saarikivi et al. ............. 380/277 |
| 2006/0018470 | A1 | * | 1/2006 | Paila et al. ................. 380/223 |
| 2006/0034321 | A1 | * | 2/2006 | Paila et al. ................. 370/464 |
| 2006/0155850 | A1 | * | 7/2006 | Ma et al. ................. 709/226 |
| 2008/0301743 | A1 | * | 12/2008 | Vrielink et al. ............. 725/110 |

FOREIGN PATENT DOCUMENTS

| CN | 1505355 A | | 6/2004 |
| EP | 1427142 A1 | * | 6/2004 |
| JP | 9-051298 A | | 2/1997 |
| JP | 11-027322 A | | 1/1999 |
| KR | 2001-0024443 A | | 3/2001 |
| KR | 10-2004-0068991 A | | 8/2004 |
| KR | 10-2005-0061267 A | | 6/2005 |
| WO | WO 95/27348 A1 | | 12/1995 |
| WO | WO 2006011122 A1 | * | 2/2006 |

OTHER PUBLICATIONS

ETSI TS 102 034 v 1.1.1 Mar. 2005.* TS 102 034 v.1.1.1. pp. 1-91. Mar. 2005.*
Jiang et al., "Implementation of Intelligent Home Network", Computer Engineering, May 2003, vol. 29, No. 7, pp. 169-170, 191.

* cited by examiner

*Primary Examiner* — Nathan Mitchell
(74) *Attorney, Agent, or Firm* — Sughrue Mion, PLLC (57) ABSTRACT

A method and an apparatus for transmitting additional information on digital broadcasting to an IPTV by using a home gateway are provided. The additional information on a digital broadcast program is received through an IP based home network, and a DVBSTP packet is created by using the received additional information, and the packet is transmitted to the home network. Accordingly, a user can immediately obtain various pieces of information on a current broadcast program or a next broadcast program, and thus scheduled recording can be accurately carried out by using information on a broadcast time of the broadcast program.

17 Claims, 6 Drawing Sheets

| DESCRIPTION | PAYLOAD ID | SEGMENT ID | SEGMENT VERSION | ADDITIONAL FIELD |
|---|---|---|---|---|
| CURRENT PROGRAM | 0 x 10 | SERVICE ID | CURRENT PROGRAM VERSION | - |
| NEXT PROGRAM | 0 x 11 | SERVICE ID | NEXT PROGRAM VERSION | - |
| PROGRAM SCHEDULES | 0 x 12 | EVENT ID | EVENT VERSTION | END TIME |

FIG. 5

| DESCRIPTION | ATTRIBUTE DESCRIPTION | MANDATORY/ OPTIONAL |
|---|---|---|
| MULTILINGUAL PROGRAM NAME | NAME OF THE PROGRAM FOR DISPLAY IN ONE OR MORE LANGUAGES: ONE PROGRAM NAME IS ALLOWED PER LANGUAGE CODE, AND AT LEAST ONE LANGUAGE SHALL BE PROVIDED (THOUGH NOT NECESSARILY MORE THAN ONE). | M |
| MULTILINGUAL PROGRAM DESCRIPTION | DESCRIPTION OF THE PROGRAM FOR POTENTIAL DISPLAY IN ONE OR MORE LANGUAGES; ONE DESCRIPTION PER LANGUAGE CODE. | O |
| CRID | A UNIQUE IDENTIFIER FOR THE PROGRAM IN TERMS OF TV-ANYTIME | O |
| EVENT DESCRIPTION LOCATION(S) | A URI WHICH CONVEYS WHERE ADDIGIONAL INFORMATION ON THIS PROGRAM(METADATA, ETC.)MAY BE FOUND. | O |
| START TIME/DURATION | THE START TIME AND DURATION OF THE PROGRAM | M |
| RUNNING STATUS | RUNNING STATUS OF THE PROGRAM | M |
| COMPONENT DESCRIPTIONS | FOR EACH COMPONENT | O |
| COMPONENT IDENTIFIER | IDENTIFIES THE CONTENT | O |
| MAX BITRATES | MAX BITRATES OF THE COMPONENT | O |
| CONTENT DESCRIPTION | CLASSIFIES THE CONTENT OF THE PROGRAM | O |
| DATA BROADCAST DESCRIPTIONS | IDENTIFIES THE DATA BROADCAST SERVICE | O |
| CONTENT DESCRIPTION | CLASSIFIES THE CONTENT OF THE PROGRAM | O |
| DATA BROADCAST DESCRIPTIONS | IDENTIFIES THE DATA BROADCAST SERVICE | O |
| LINKAGE DESCRIPTIONS | IDENTIFIES THE LINKAGE SERVICE | O |
| PARENTAL RATING INFO | A RATING OF THE PORGRAM BASED ON AGE OR OTHER CRITERIA | O |
| ENCRYPTION INFO | ENCRYPTION IDENTIFIER IF APPLICABLE | O |
| REFERENCED CONTENT(S) | FOR EACH REFERENCED CONTENT | O |
| CRID(S)/CONTENT LOCATOR(S) | PROGRAM IDENTIFIER FOR THE REFERENCED CONTENT | O |
| REFERENCED CONTENT DESCRIPTION | DESCRIPTION OF THE REFERENCED CONTENT | O |
| ICON | ICON FOR POTENTIAL DISPLAY | O |

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|Resrv|Enc|C|          total_CurrentEvent_size              |
+-+-+-+-+-+-+-+-+-+-+-+-+-+-+-+-+-+-+-+-+-+-+-+-+-+-+-+-+-+-+-+-+
|     0x10      |          Service ID           |version_number |
+-+-+-+-+-+-+-+-+-+-+-+-+-+-+-+-+-+-+-+-+-+-+-+-+-+-+-+-+-+-+-+-+
| section_Number|   last_section_number         |Compr|0|   1   |
+-+-+-+-+-+-+-+-+-+-+-+-+-+-+-+-+-+-+-+-+-+-+-+-+-+-+-+-+-+-+-+-+
|                                                               |
:                      CurrentEvent Info                        :
|                                       +-+-+-+-+-+-+-+-+
|                                       |        CRC    |
+-+-+-+-+-+-+-+-+-+-+-+-+-+-+-+-+-+-+-+-+-+-+-+-+-+-+-+-+-+-+-+-+
|                  CRC (Cont)           |
+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|Resrv|Enc|C|          total_NextEvent_size                 |
+-+-+-+-+-+-+-+-+-+-+-+-+-+-+-+-+-+-+-+-+-+-+-+-+-+-+-+-+-+-+-+-+
|     0x11      |          Service ID           |version_number |
+-+-+-+-+-+-+-+-+-+-+-+-+-+-+-+-+-+-+-+-+-+-+-+-+-+-+-+-+-+-+-+-+
| section_Number|   last_section_number         |Compr|0|   0   |
+-+-+-+-+-+-+-+-+-+-+-+-+-+-+-+-+-+-+-+-+-+-+-+-+-+-+-+-+-+-+-+-+
|                                                               |
:                       NextEvent Info                          :
|                                       +-+-+-+-+-+-+-+-+
|                                       |        CRC    |
+-+-+-+-+-+-+-+-+-+-+-+-+-+-+-+-+-+-+-+-+-+-+-+-+-+-+-+-+-+-+-+-+
|                  CRC (Cont)           |
+-+-+-+-+-+-+-+-+-+-+-+-+-+-+-+-+-+-+-+-+
```

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|Resrv|Enc|C|              total_Event_size                 |
+-+-+-+-+-+-+-+-+-+-+-+-+-+-+-+-+-+-+-+-+-+-+-+-+-+-+-+-+-+-+-+-+
|     0x12      |           Event ID            |version_number |
+-+-+-+-+-+-+-+-+-+-+-+-+-+-+-+-+-+-+-+-+-+-+-+-+-+-+-+-+-+-+-+-+
| section_Number|  last_section_number  |Compr|0|      1        |
+-+-+-+-+-+-+-+-+-+-+-+-+-+-+-+-+-+-+-+-+-+-+-+-+-+-+-+-+-+-+-+-+
|                           EndTime                              |
+-+-+-+-+-+-+-+-+-+-+-+-+-+-+-+-+-+-+-+-+-+-+-+-+-+-+-+-+-+-+-+-+
:                          Event Info                           :
|                                       +-+-+-+-+-+-+-+-+
|                                       |       CRC     |
+-+-+-+-+-+-+-+-+-+-+-+-+-+-+-+-+-+-+-+-+-+-+-+-+-+-+-+-+
|              CRC (Cont)               |
+-+-+-+-+-+-+-+-+-+-+-+-+-+-+-+-+-+-+-+-+
```

FIG. 9

METHOD AND APPARATUS FOR PROVIDING ADDITIONAL INFORMATION ON DIGITAL BROADCASTING PROGRAM TO IPTV IN HOME NETWORK

CROSS-REFERENCE TO RELATED PATENT APPLICATION

This application claims priority from Korean Patent Application No. 10-2005-0086995, filed on Sep. 16, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to providing additional information on digital broadcasting, and more particularly, to transmitting additional information on digital broadcasting to an Internet Protocol TV (IPTV) by using a home gateway.

2. Description of the Related Art

With rapidly growing network speeds and the development of Internet based quality of service (QoS) techniques, an Internet Protocol television (IPTV) has emerged which allows a digital broadcasting service to be provided through the Internet. Conventionally, digital broadcasting services have been provided through satellite, cable, or ground waves. IPTV products have been developed and released by many businesses using their own technologies. Various standards related to IPTV technology have been introduced, and research into IPTV technology has been actively conducted. The TM-IPI ad-hoc group under the Digital Video Broadcasting (DVB) Project is a representative IPTV standard group. A phase 1 standard is related to an MPEG-2 transport stream (TS) based digital broadcasting service. Currently, a phase 2 standard is ready to be released, which is related to an IP based digital broadcasting service. In this case, audio/video (AV) data to be transmitted is encoded using MPEG-2 or MPEG 4 based on IP rather than a transport stream (TS).

Figure 1:
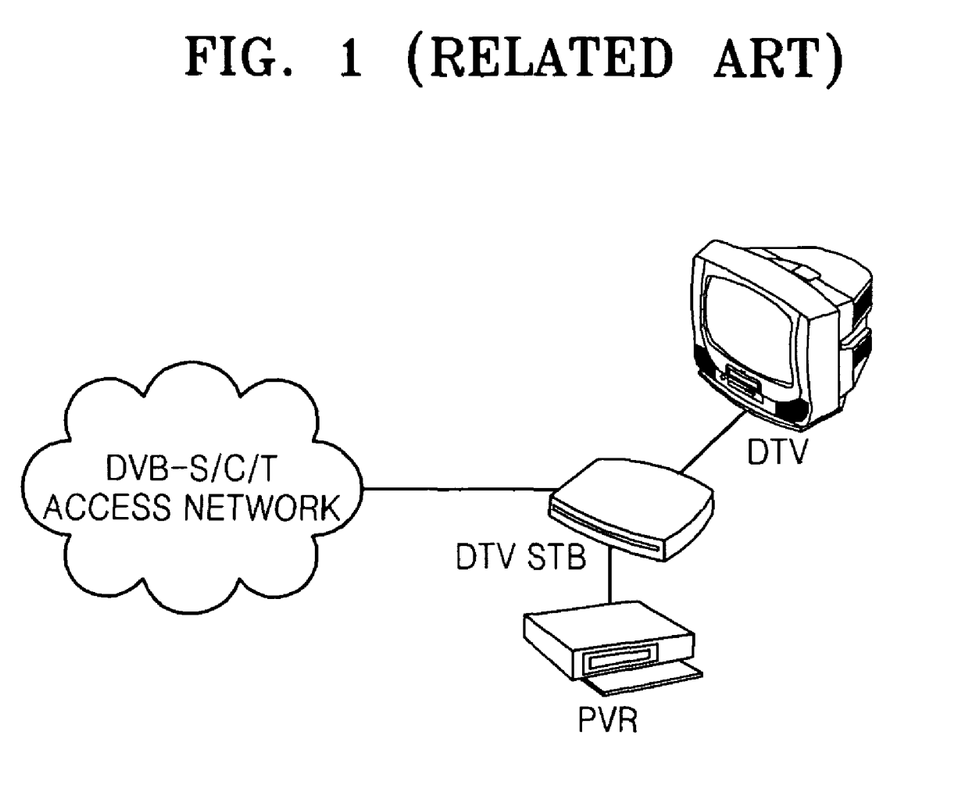
FIG. 1 illustrates a related art digital broadcasting system.

FIG. 1 illustrates a related art digital broadcasting system. A related art personal video recorder (PVR) is embedded in a set top box (STB). The STB transmits a broadcast signal through a satellite, a cable, or a ground wave to the PVR, and the PVR records the broadcast signal. A related art digital TV (DTV) is directly connected to the STB and receives a broadcast program transmitted through satellite, cable, or ground wave, and displays the broadcast program or content stored in the PVR.

In a conventional digital broadcasting system, additional information on a broadcasting service is directly received through a broadcast access network using satellite, cable, or ground wave transmission. The additional information may be used for an electronic program guide (EPG). Further, a user may use the additional information to obtain information on a broadcast program. The additional information uses DVB service information (DVB-SI) in a Multimedia Home Platform (MHP), and uses program and system information protocol (PSIP) in an Open Cable Application Platform (OCAP).

Figure 2:
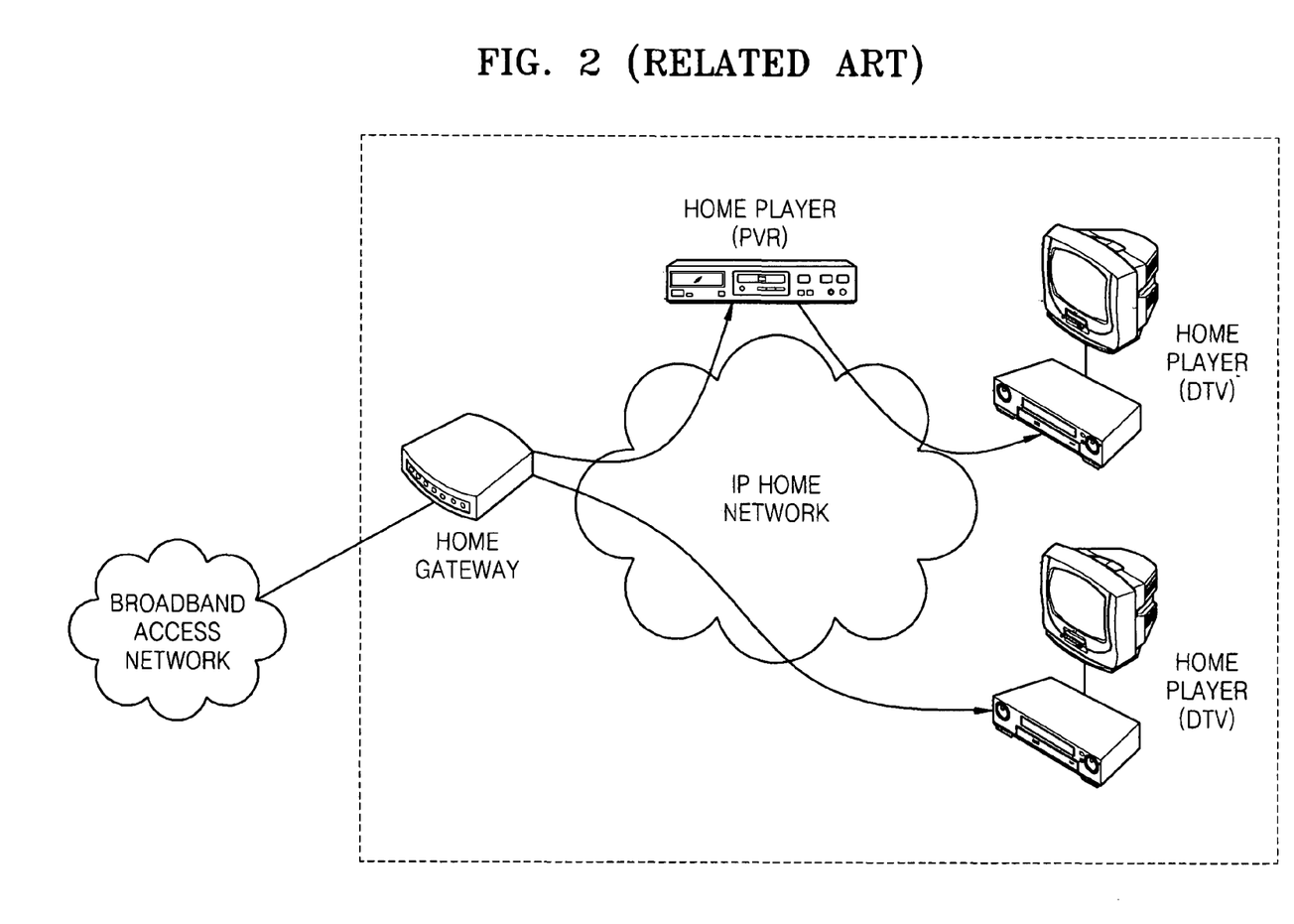
FIG. 2 illustrates a digital broadcasting system for an IPTV in a home network.

FIG. 2 illustrates a digital broadcasting system for an IPTV in a home network.

Referring to FIG. 2, the IPTV (DTV) is separated from a home gateway. The home gateway receives information transmitted through a broadband network and sends the information to the IPTV through the home network.

The IPTV which provides a digital broadcasting service through the broadband access network such as the Internet cannot use a service information method which is used in a data broadcasting service provided through the broadcast access network using satellite, cable, or ground wave transmission. Thus, a method of transmitting additional information on the broadcast program is required, which is suitable for the IPTV environment.

The standard for providing an MPEG-2 IP based broadcast service is disclosed in the "Transport of MPEG-2 based DVB services over IP based networks" specification (hereinafter referred to as TS 012 034 standard) proposed by the TM-IPI group of the European Telecommunications Standards Institute (ETSI). This standard defines service discovery and selection (SD&S) information through which a home network end device (HNED) detects a service and identifies a service provider to select a desired service, and a DVB service discovery and selection transport protocol (DVBSTP) which is used to multicast the SD&S information. However, the standard does not define a method of transmitting information on a broadcast program (i.e., broadcasting time, program title, etc.) to the HNED.

SUMMARY OF THE INVENTION

The present invention provides a method and an apparatus for providing information on a broadcast program to an IPTV in a home network by using a digital video broadcasting service discovery and selection transport protocol (DVBSTP) packet.

According to an aspect of the present invention, there is provided a method of providing information on a broadcast program received through an IP based network to a home network, the method comprising: receiving additional information on the broadcast program of digital broadcasting through the IP based network; creating a packet to be transmitted to the home network by using the additional information; and transmitting the created packet to the home network.

The created packet may be transmitted to the home network while data of the broadcast program is transmitted to the home network, and the created packet may comprise an identifier for identifying a broadcast channel of the broadcast program. In addition, the created packet may be a DVBSTP packet, and a value for identifying the broadcast channel of the broadcast program may be written in a segment ID field of the created packet.

The present invention also provides a computer-readable medium having embodied thereon a computer program for executing the method above.

According to another aspect of the present invention, there is provided an apparatus for providing information on a broadcast program received through an IP based network to a home network, the apparatus comprising: a receiving unit which receives additional information on the broadcast program of the digital broadcasting through the IP based network; a packet creating unit which creates a packet to be transmitted to the home network by using the additional information; and a transmitting unit which transmits the created packet to the home network.

The transmitting unit may transmit the packet created by the packet creating unit to the home network along with data of the broadcast program, and the packet creating unit may allow the packet to comprise an identifier for identifying a broadcast channel of the broadcast program.

In addition, the packet created by the packet creating unit may be a DVBSTP packet, and a value for identifying the broadcast channel of the broadcast program may be written in a segment ID field of the created packet.

In addition, the DVBSTP packet may comprise at least one of a multilingual title of the broadcast program, an identifier for identifying the broadcast program from other broadcast programs, a start time of the broadcast program, a duration of the broadcast program, and a running status of the broadcast program.

BRIEF DESCRIPTION OF THE DRAWINGS

The above and other aspects of the present invention will become more apparent by describing in detail exemplary embodiments thereof with reference to the attached drawings, in which:

FIG. 5 illustrates values included in a DVB service discovery and selection transport protocol (DVBSTP) packet according to an exemplary embodiment of the present invention;

DETAILED DESCRIPTION OF EXEMPLARY EMBODIMENTS

Hereinafter, the present invention will be described in detail by explaining exemplary embodiments of the invention with reference to the attached drawings.

Figure 3:
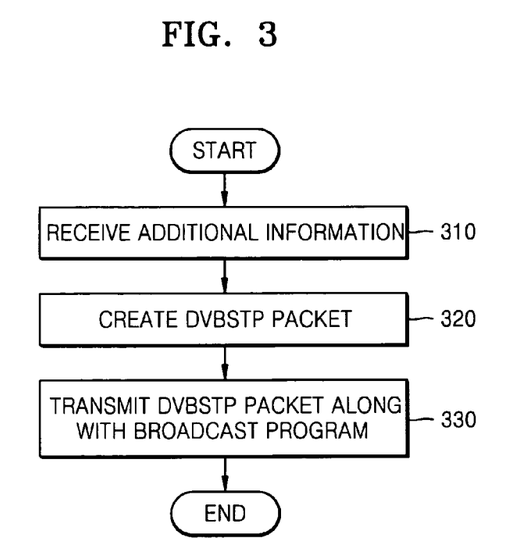
FIG. 3 is a flowchart illustrating a method of providing additional information on a broadcast program to a home network according to an exemplary embodiment of the present invention.

FIG. 3 is a flowchart illustrating a method of providing additional information on a broadcast program to a home network according to an exemplary embodiment of the present invention.

First, a home gateway receives the additional information on the broadcast program from a broadcast service provider through a transport network (operation 310). The home gateway creates a packet to be transmitted to a home network end device (HNED) through the home network by using the received additional information (operation 320). According to the current exemplary embodiment of the present invention, the additional information is transmitted using a DVB-STP packet defined in the TS 012 034 standard of the ETSI. When the DVBSTP packet is created, the packet is transmitted to the home network along with a TS of a relevant broadcast program (operation 330). Using this, a TV viewer can obtain the additional information on the broadcast program while watching a current broadcast program. At this time, the DVBSTP packet includes a payload ID and a service ID. The payload ID indicates that the packet contains additional information on the current broadcast program. By using the service ID, the HNED, that is, an IPTV, can recognize a broadcast channel to which the additional information is provided.

In another exemplary embodiment of the present invention, information on a next broadcast program may be transmitted along with the information on the current broadcast program.

Figure 4:
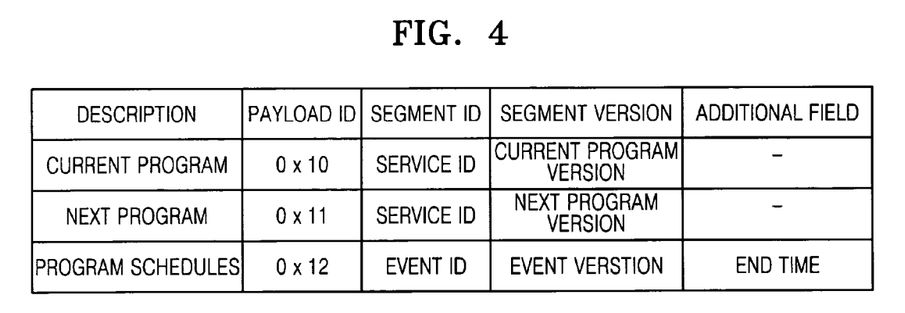
FIG. 4 illustrates fields required to transmit additional information on a broadcast program according to an exemplary embodiment of the present invention.

FIG. 4 illustrates fields required to transmit additional information on a broadcast program according to an exemplary embodiment of the present invention.

Referring to FIG. 4, the additional information contains information on a current program, a next program, and a program schedule.

The payload ID of the current program is 0×10, the payload identifier (ID) of the next program is 0×11, and the payload ID of the program schedule is 0×12, which are arbitrarily selected from reserved payload ID values of the SD&S defined by the TS 012 034 standard. Besides these values, other values can be used if they are identifiable by their payload IDs.

In the case of the current program or the next program, broadcast channels are specified for the additional information. A service ID for identifying the broadcast channels of service providers are written in a segment ID field of the DVBSTP packet. Modification details of the additional information corresponding to the service ID are written in a segment version field of the DVBSTP. The segment version field value is initially set to 0, and is increased by 1 whenever the additional information is modified. In the HNED, information modification can be easily detected by comparing a segment version of currently stored additional information with a segment version of currently received information.

The location of the current program or the next program may be defined by a service description location of the broadcast discovery record-TS optional SI in the service discovery and selection (SD&S) proposed by the TS 012 034 standard of the ETSI. If the MPEG-2 TS contains the DVB-SI information, in order to obtain extra information, the location may be defined according to the service descriptions location of the broadcast discovery record-TS full SI. The location may be dvbstp://IPmulticast address[:port] in the case of multicast, and http://IPaddress[:port] in the case of unicast.

In the case of the program schedule, an event ID is written in the segment ID field to specify a program, and modification details of schedule information corresponding to the event ID are written in the segment version field. Further, an additional field, which is not defined in the related art DVBSTP packet, is provided to store an EndTime for indicating an end time of the program corresponding to the event ID. A user can record the program as scheduled at a correct time using an electronic program guide (EPG).

FIG. 5 illustrates values included in the DVBSTP packet according to an exemplary embodiment of the present invention.

The values are included in a payload of the DVBSTP packet. A multilingual program name is a program title written in one or more languages. A multilingual program description is a program description written in one or more languages. A Content Reference Identifier (CRID) is used to obtain additional information from TV-anytime metadata.

An event description location is the location where the additional information may be found. The start time and duration of the program is written in the time/duration field.

A running status of the program is written in a running status field. A component description field includes information on each component such as audio, video, data, or subtitles of the program. Further, a resolution or a required maximum bandwidth may be included. A content description field includes information on which genre the program belongs to. A linkage description identifies an alternative service. A data broadcasting description includes information on data broadcasting. A parental rating description includes information on a rating of the program based on age. An encryption description includes information on encryption. A referenced content field provides various pieces of information on the program. The referenced content field may include additional information on the program, a preview, and a price of a product related to the program. To indicate a description and location of the referenced content, a reference content description and a locator may be provided. The locator may be indicated by the CRID or an IP address/port/service ID. The CRID may be used as an index for TV Anytime (TVA) metadata in order to obtain the additional information.

Some fields such as the component description, max bitrates, and the referenced content may be provided more than once according to the number of components of the program.

Required fields may vary depending on a service provider or embodiments of an IPTV hardware implementation.

Figure 6:
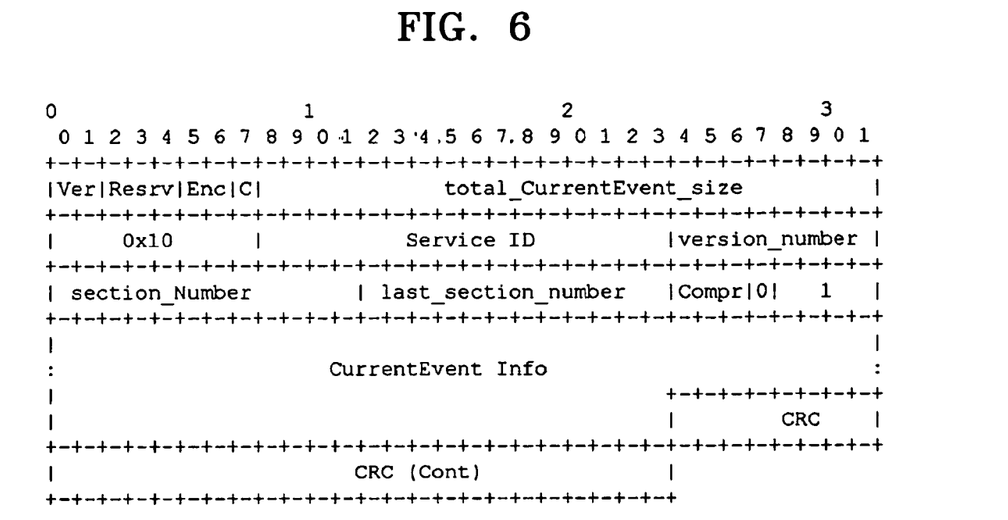
FIG. 6 illustrates a configuration of a DVBSTP packet of a current broadcast program according to an exemplary embodiment of the present invention.

FIG. 6 illustrates a configuration of a DVBSTP packet of a current broadcast program according to an exemplary embodiment of the present invention.

The configuration is similar to that of the DVBSTP packet defined by the TS 012 034 standard of the ETSI, except that the segment ID is replaced with the service ID as described above, and information on the current program is written in the payload. When the packet of FIG. 6 is transmitted to the HNED through the home network, the HNED reads the payload ID to recognize that the received packet contains additional information on the current broadcast program, and reads the service ID to recognize a broadcast channel of the program. The packet only indicates that the information is related to the current broadcast program through the payload ID, and does not include information on time at which the program is broadcast. Therefore, the packet has to be transmitted along with a TS of the broadcast program.

Figure 7:
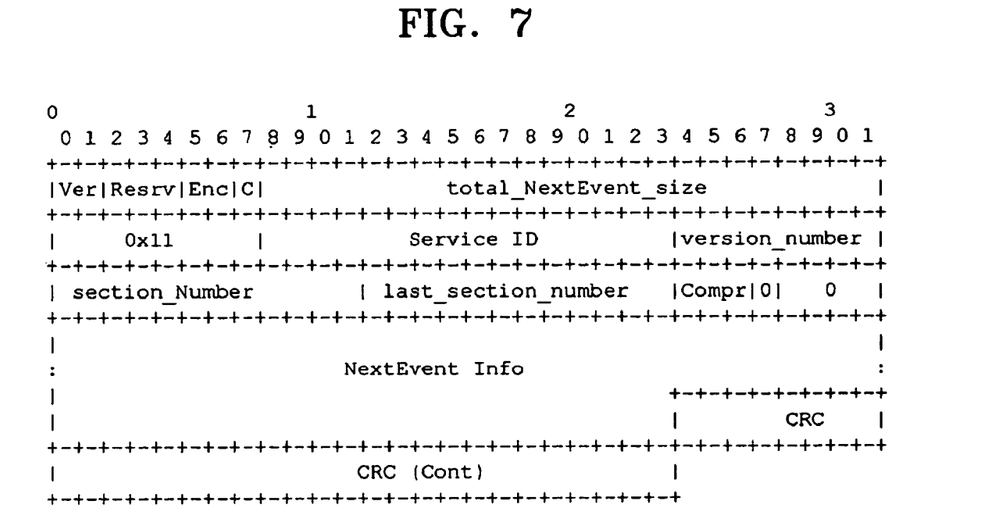
FIG. 7 illustrates a configuration of a DVBSTP packet of a next broadcast program according to an exemplary embodiment of the present invention.

FIG. 7 illustrates a configuration of a DVBSTP packet of a next broadcast program according to an exemplary embodiment of the present invention.

Similarly to the packet of FIG. 6, in the DVBSTP packet of the next broadcast program of FIG. 7, the segment ID is replaced with the service ID, and information on the next broadcast program is stored in the payload. Also, the packet does not include information on a broadcast time, and only indicates that the additional information on the next broadcast program is included, through the service ID and the payload ID. Therefore, the packet also has to be transmitted along with a TS of a program which is broadcast prior to the program that is indicated by the additional information included in the packet.

Figure 8:
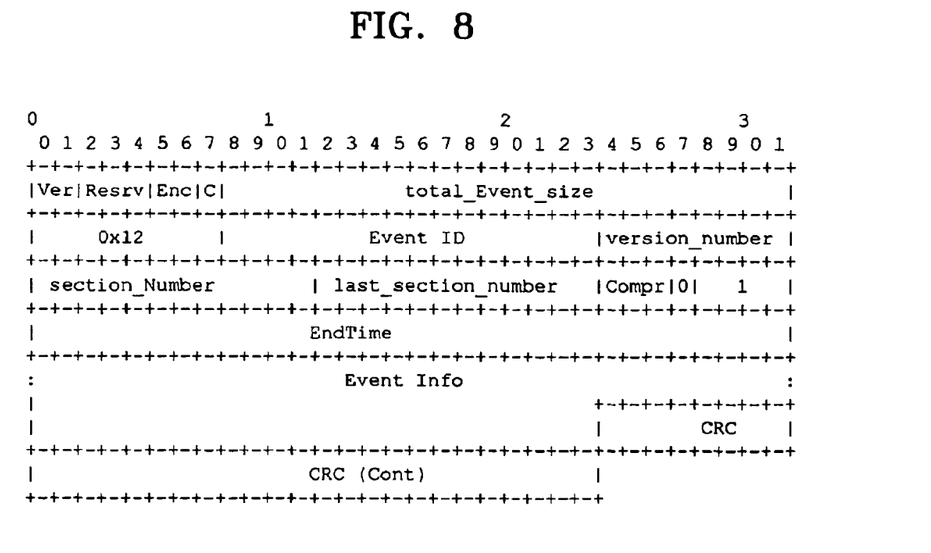
FIG. 8 illustrates a configuration of a DVBSTP packet of a broadcast program schedule according to an exemplary embodiment of the present invention.

FIG. 8 illustrates a configuration of a DVBSTP packet of a broadcast program schedule according to an exemplary embodiment of the present invention. The packet of FIG. 8 is for transmitting schedule information on a specific broadcast program, and includes an event ID for identifying the broadcast program instead of the segment ID of a related art DVBSTP packet. In particular, an EndTime field is added which is not included in a related art DVBSTP packet. The HNED uses this field to recognize when the program is ended, which can be used for scheduled recording.

Figure 9:
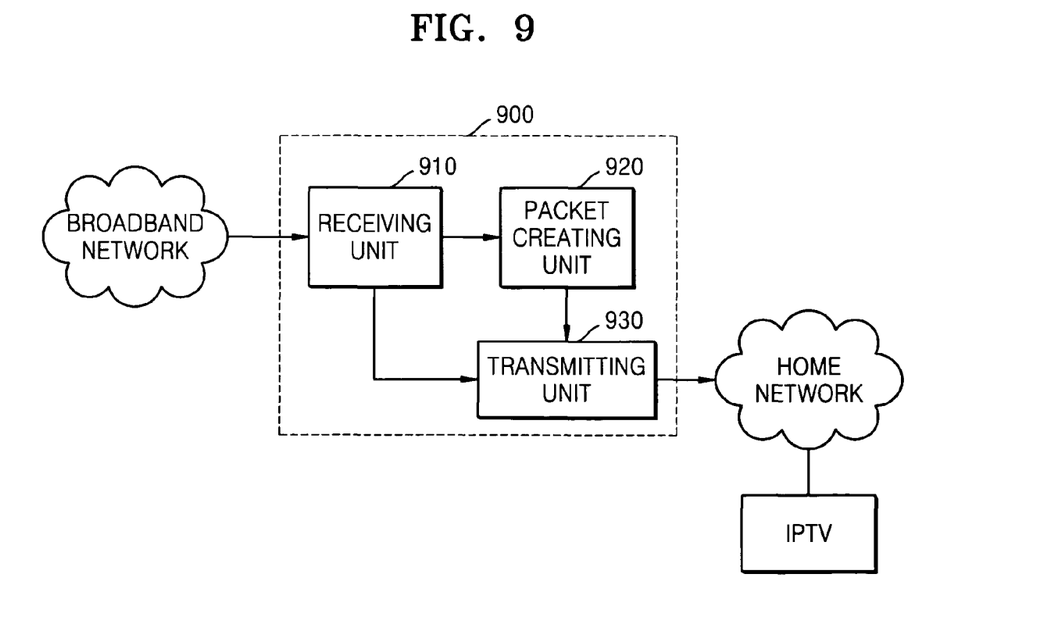
FIG. 9 is a block diagram of a home gateway for providing additional information on a broadcast program to a home network according to an exemplary embodiment of the present invention.

FIG. 9 is a block diagram of a home gateway 900 for providing additional information on a broadcast program to a home network according to an exemplary embodiment of the present invention.

Referring to FIG. 9, the home gateway 900 includes a receiving unit 910, a packet creating unit 920, and a transmitting unit 930. The receiving unit 910 receives a TS of the broadcast program and additional information on the broadcast program through a broadband network. The packet creating unit 920 creates a DVBSTP packet by using the additional information received by the receiving unit 910. As described above, the packet may include information on the current program, the next program, or the program schedule. The transmitting unit 930 transmits the DVBSTP packet created by the packet creating unit 920 to the IPTV through the home network. As described above, the packet including information on the current program is transmitted along with the TS of the current program, and the packet including information on the next program is transmitted along with the TS of a program which is broadcast prior to the next program through the same program channel.

Accordingly, in an exemplary embodiment of the present invention, a home gateway transmits information on a broadcast program to an IPTV in real time, so that a user can immediately obtain various pieces of information on a current broadcast program or a next broadcast program, and thus scheduled recording can be accurately carried out by using information on a broadcast time of the program.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

Although the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing information on a broadcast program received through an Internet Protocol (IP) based network to a home network, the method comprising:

receiving, at a home gateway connected to the home network, additional information on the broadcast program which is broadcast through the IP based network;

creating, at the home gateway, a packet using the additional information; and transmitting the packet from the home gateway to a home network device via the home network, wherein the packet is a digital video broadcasting service discovery and selection transport protocol (DVBSTP) packet, and wherein a value for identifying a broadcast channel of the broadcast program is written in a segment ID field of the DVBSTP packet and the additional information is included in the payload of the DVBSTP packet.

2. The method of claim 1, wherein the packet is transmitted to the home network device while data of the broadcast program is transmitted to the home network device, and wherein the packet comprises an identifier (ID) for identifying the broadcast channel of the broadcast program.

3. The method of claim 1, wherein the packet is transmitted along with data of a previous broadcast program which is broadcast prior to the broadcast program in a same channel of the broadcast program, and the packet comprises an identifier (ID) for identifying the broadcast channel of the broadcast program.

4. The method of claim 1, wherein the packet comprises a field in which an end time of the broadcast program is written, and a payload which includes a start time of the broadcast program.

5. The method of claim 1, wherein the packet comprises at least one of a multilingual title of the broadcast program, an identifier for identifying the broadcast program from other broadcast programs, a start time of the broadcast program, a duration of the broadcast program, and a running status of the broadcast program.

6. A computer-readable medium having embodied thereon a computer program for executing a method of providing information on a broadcast program received through an Internet Protocol (IP) based network to a home network, the method comprising:
receiving, at a home gateway connected to the home network, additional information on the broadcast program which is broadcast through the IP based network;
creating, at the home gateway, a packet using the additional information; and
transmitting the packet from the home gateway to a home network device via the home network device,
wherein the packet is a digital video broadcasting service discovery and selection transport protocol (DVBSTP) packet, and
wherein a value for identifying a broadcast channel of the broadcast program is written in a segment ID field of the DVBSTP packet and the additional information is included in the payload of the DVBSTP packet.

7. The computer-readable medium of claim 6, wherein the packet is transmitted to the home network device while data of the broadcast program is transmitted to the home network device, and
wherein the packet comprises an identifier (ID) for identifying the broadcast channel of the broadcast program.

8. The computer-readable medium of claim 6, wherein the packet is transmitted along with data of a previous broadcast program which is broadcast prior to the broadcast program in a same channel of the broadcast program, and the packet comprises an identifier (ID) for identifying the broadcast channel of the broadcast program.

9. The computer-readable medium of claim 6, wherein the packet comprises a field in which an end time of the broadcast program is written, and a payload which includes a start time of the broadcast program.

10. The computer-readable medium of claim 6, wherein the packet comprises at least one of a multilingual title of the broadcast program, an identifier for identifying the broadcast program from other broadcast programs, a start time of the broadcast program, a duration of the broadcast program, and a running status of the broadcast program.

11. An apparatus for providing information on a broadcast program received through an Internet Protocol (IP) based network to a home network to which the apparatus is connected, the apparatus comprising:
a receiving unit which receives additional information on the broadcast program which is broadcast through the IP based network;
a packet creating unit which creates a packet using the additional information; and
a transmitting unit which transmits the packet to a home network device via the home network,
wherein the packet is a digital video broadcasting service discovery and selection transport protocol (DVBSTP) packet, and
wherein a value for identifying a broadcast channel of the broadcast program is written in a segment ID field of the DVBSTP packet and the additional information is included in the payload of the DVBSTP packet.

12. The apparatus of claim 11, wherein the transmitting unit transmits the packet created by the packet creating unit to the home network device along with data of the broadcast program via the home network, and
wherein the packet comprises an identifier (ID) for identifying the broadcast channel of the broadcast program.

13. The apparatus of claim 11, wherein the transmitting unit transmits the packet along with data of a previous broadcast program which is broadcast prior to the broadcast program in a same channel of the broadcast program, and
wherein the packet comprises an identifier (ID) for identifying the broadcast channel of the broadcast program.

14. The apparatus of claim 11, wherein the packet comprises a field in which an end time of the broadcast program is written, and a payload including a start time of the broadcast program.

15. The apparatus of claim 11, wherein the packet comprises at least one of a multilingual title of the broadcast program, an identifier for identifying the broadcast program from other broadcast programs, a start time of the broadcast program, a duration of the broadcast program, and a running status of the broadcast program.

16. The method of claim 1, wherein the additional information includes information on a current broadcast program.

17. The method of claim 16, wherein the additional information further includes information on a next broadcast program.

* * * * *